United States Patent

Park

Patent Number: 5,269,544
Date of Patent: Dec. 14, 1993

[54] CARRIAGE FOR TRAVERSING IRREGULAR SURFACES

[76] Inventor: Chul Park, 1837 Green Place Ter., Rockville, Md. 20850

[21] Appl. No.: 7,898

[22] Filed: Jan. 22, 1993

[51] Int. Cl.⁵ .............................................. B62B 5/02
[52] U.S. Cl. .................... 280/5.24; 280/644; 280/42; 280/650; 280/47.371
[58] Field of Search ............... 280/5.2, 5.22, 5.24, 280/5.28, 47.2, 47.34, 47.371, 47.38, 641, 642, 644, 42, 650; 410/51; 414/490

[56] References Cited

U.S. PATENT DOCUMENTS

| | | | |
|---|---|---|---|
| 1,000,230 | 8/1911 | Bleimann | 280/5.24 |
| 1,105,379 | 7/1914 | Schulze | 280/5.22 |
| 1,513,045 | 10/1924 | Jordan et al. | 280/5.24 |
| 1,820,669 | 8/1931 | Loerke | 280/5.24 |
| 2,263,879 | 11/1941 | Jorgensen | 280/5.24 |
| 2,467,644 | 4/1949 | Wright et al. | 280/5.24 |
| 2,635,887 | 4/1953 | Menne | 280/5.24 |
| 2,743,833 | 5/1956 | Peterson | 280/5.24 |
| 2,772,096 | 11/1956 | Hanson | 280/5.24 |
| 3,137,511 | 6/1964 | Weil et al. | 280/5.24 |
| 3,788,659 | 1/1974 | Allen | 280/5.24 |
| 4,130,291 | 12/1978 | Saethre et al. | 280/5.22 |
| 4,473,234 | 9/1984 | Egen | 280/5.22 |
| 4,570,954 | 2/1986 | Mintz | 280/5.24 |
| 5,022,669 | 6/1991 | Johnson | 280/5.24 X |

Primary Examiner—Margaret A. Focarino
Assistant Examiner—Michael Mar
Attorney, Agent, or Firm—Birch, Stewart, Kolasch & Birch

[57] ABSTRACT

A carriage for traversing irregular surfaces, including a pair of extendable handles, a pair of skids to be operated by extending the handles, and a brake system for stopping the carriage on the flat floor of one of stairs whereby the carriage can smoothly slide along the traversed surfaces.

10 Claims, 3 Drawing Sheets

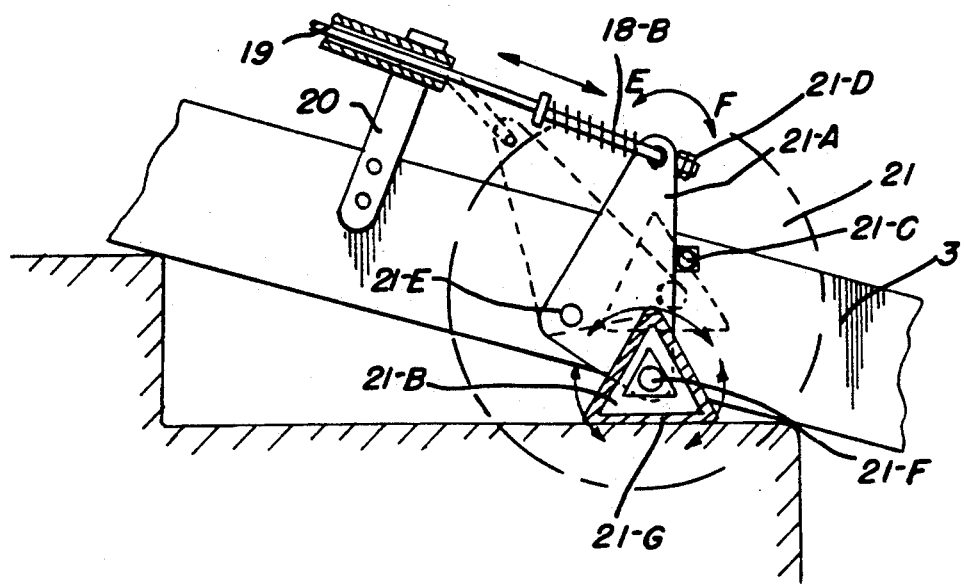
FIG. 6A
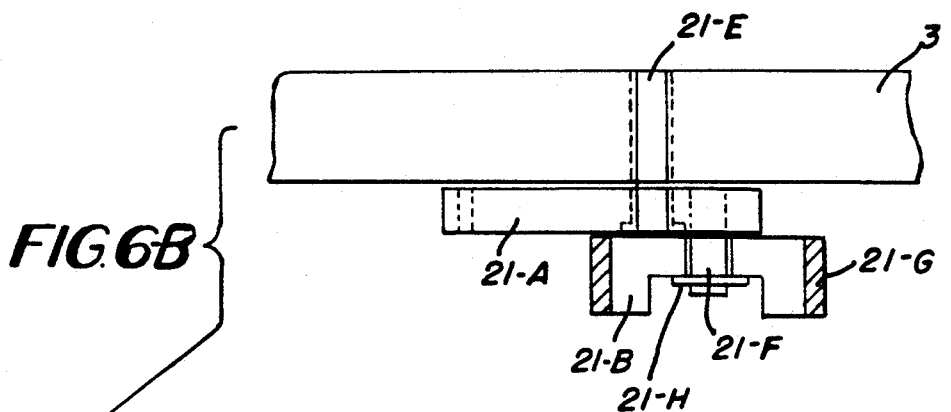
FIG. 6B
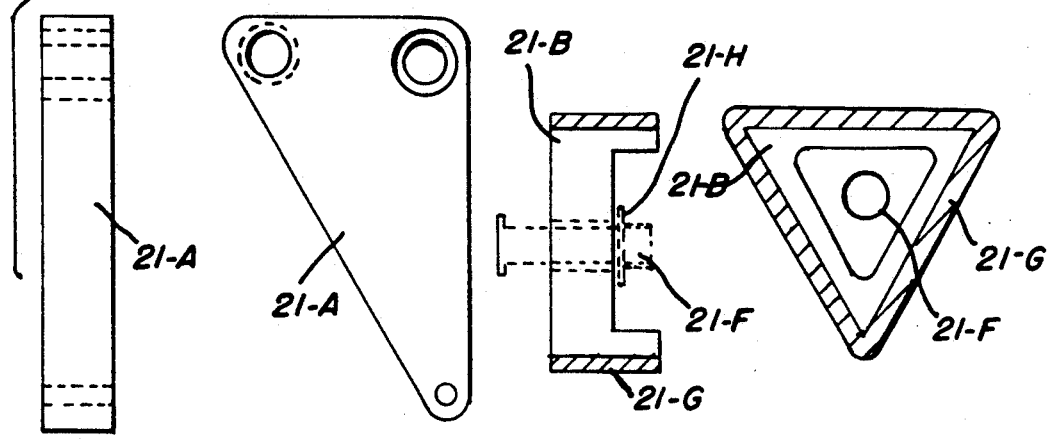

CARRIAGE FOR TRAVERSING IRREGULAR SURFACES

BACKGROUND OF THE INVENTION

1. Field of the Invention

The present invention relates to a carriage for traversing irregular surfaces and more particularly, to a baby stroller to be rolled along an approximately horizontal surface and to be slid upstairs and downstairs without bumping an infant carried therein. Furthermore, the carriage provides a smooth ride and is easy to stop and easy to pull.

2. Description of the Related Art

Various types of carriages such as baby strollers, barrel trucks, stretcher chairs, and lift carts are well known in the art. Most of them have skids for smoothly sliding along a high friction surface. Such conventional carriages are shown in U.S. Pat. No. 1,105,379 to Schulze, U.S. Pat. No. 1,513,045 to Jordan et al.; U.S. Pat. No. 1,820,669 to Loerke; U.S. Pat. No. 2,263,879 to Jorgensen; U.S. Pat. No. 2,635,887 to Menne; U.S. Pat. No. 2,743,833 to Peterson; U.S. Pat. No. 3,137,511 to Weil et al.; U.S. Pat. No. 3,788,659 to Allen; U.S. Pat. No. 473,234 to Egen; U.S. Pat. No. 4,570,954 to Mintz and U.S. Pat. No. 5,022,669 to Johnson. However, these carriages include skids attached to a main frame thereof, and fail to provide means for stopping and an extendable handle so that it is difficult to operate, carry and transport and is inconvenient to collapse.

SUMMARY OF THE INVENTION

Accordingly, it is an object of the present invention to provide an improved carriage for traversing irregular surfaces.

Another object of the present invention is to provide an improved baby stroller having a pair of extendable handles and skids for easily sliding upstairs and downstairs and which is easy to pull and easy to collapse.

A further object of the present invention is to provide an improved baby stroller having a brake system for easily stopping the baby stroller on a flat floor of upstairs and downstairs.

Still another object of the present invention is to provide an improved baby stroller which is simple in structure, easy to use, compact in transportation, refined in appearance and inexpensive to manufacture.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Briefly described, the present invention relates to a carriage for traversing irregular surfaces which includes a pair of extendable handles, a pair of skids to be operated by extending the handles, and a brake system for stopping the carriage on the flat floor of stairs whereby the carriage can smoothly slide along the traversed surfaces.

BRIEF THE DRAWINGS

The present invention will become more fully understood from the detailed description given hereinbelow and the accompanying drawings which are given by way of illustration only, and thus are not limitative of the present invention, and wherein:

FIG. 6A is a front elevational view of a brake system of the baby carriage according to the present invention containing cut-away portions in order to explain the construction thereof; and FIG. 6B is an exploded view of FIG. 6A.

PREFERRED EMBODIMENTS OF THE INVENTION

Figure 1:
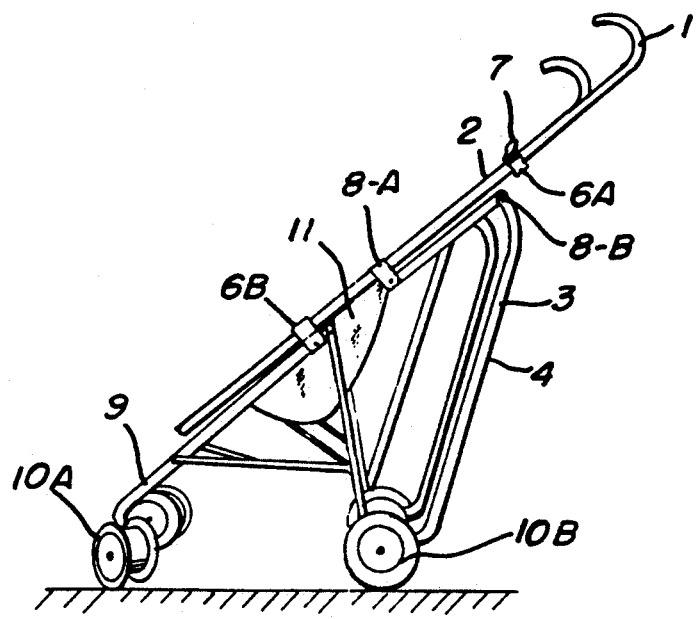
FIG. 1 is a side view of a carriage on an approximately horizontal surface according to the present invention.
Figure 2:
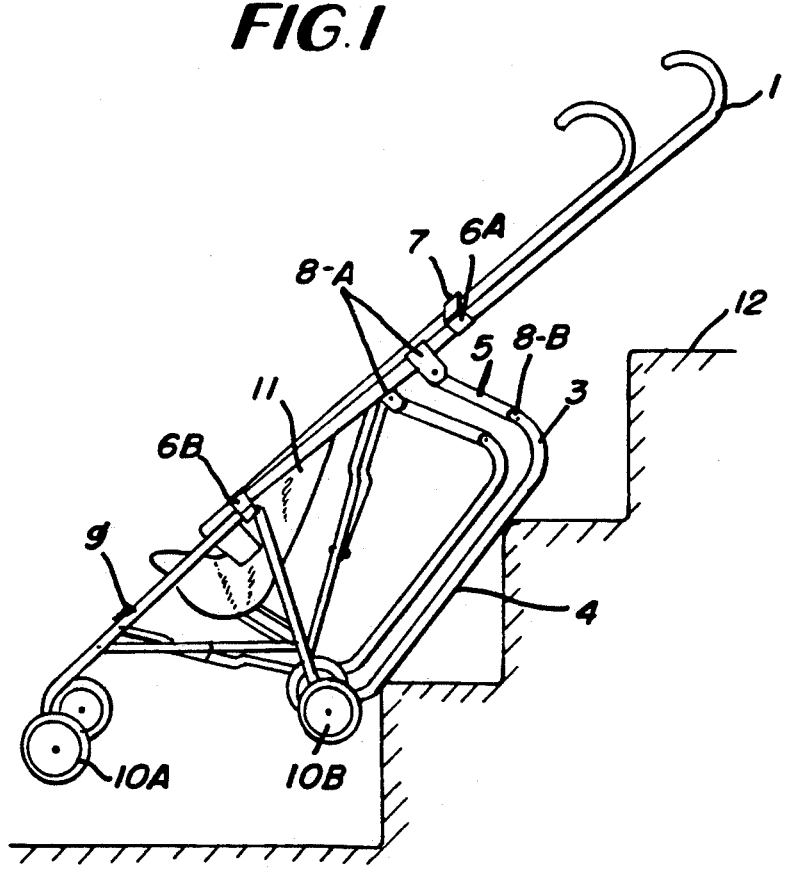
FIG. 2 is a side view of the carriage on a set of stairs according to the present invention.
Figure 3:
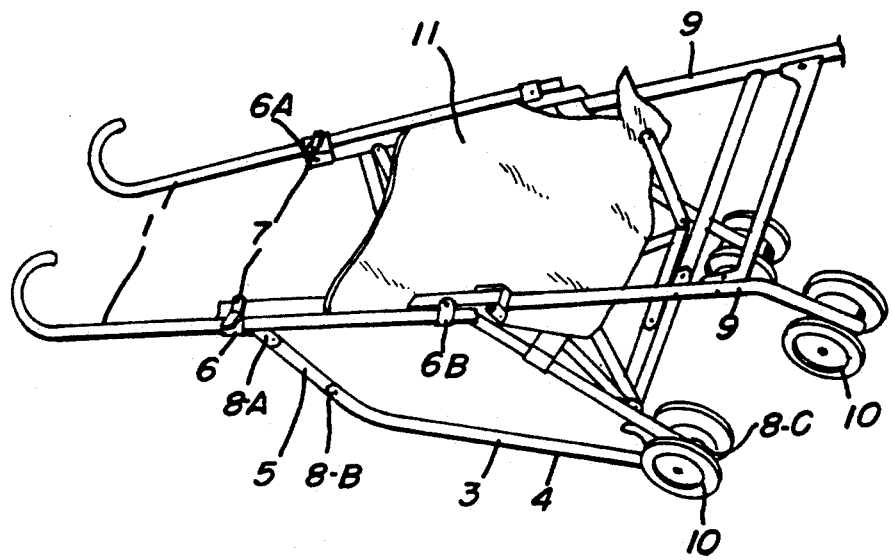
FIG. 3 is a perspective view of the carriage according to the present invention.

Referring now in detail to the drawings for the purpose of illustrating preferred embodiments of the present invention, the carriage for traversing irregular surfaces as shown in FIGS. 1, 2 and 3 comprises a pair of parallel carriage frames 9, a pair of handle receivers 2 attached to the parallel carriage frames 9, respectively for slidably receiving a pair of extendable handles 1, and a pair of front wheels 10A and rear wheels 10B.

Figure 5:
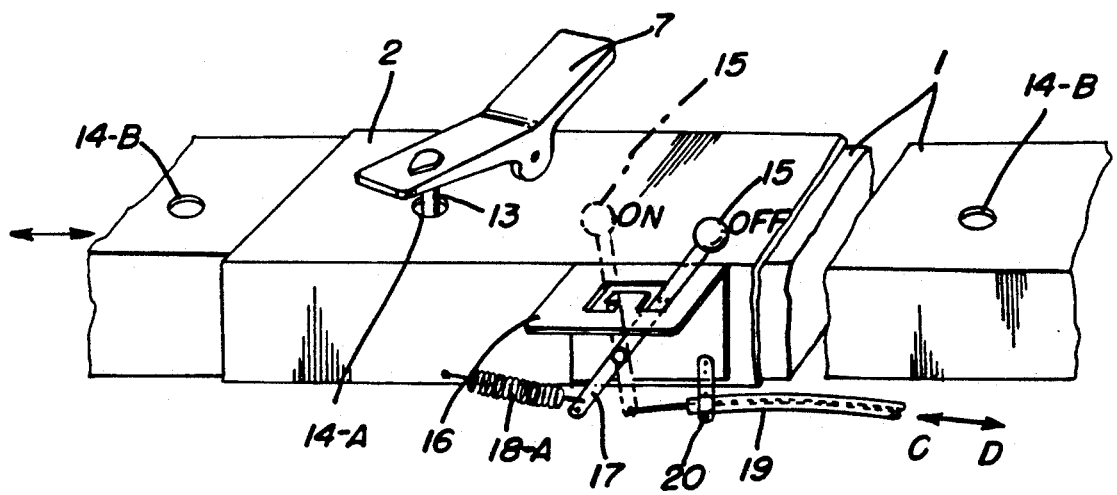
FIG. 5 is a perspective view of a locking system for locking a handle to a main frame according to the present invention.

Each handle receiver 2 includes an upper ring 6A and a lower ring 6B for slidably receiving the extendable handle 1 and a locking knob 7 having a T-shaped configuration and attached on the upper portion thereof for locking and releasing the extendable handle 1 to the handle receiver 2 by inserting a locking pin 13 into an upper aperture 14A and a lower aperture 14B disposed on the middle portion and the end portion of the handle 1 through an aperture 14 (FIG. 5). When the locking pin 13 is inserted into the lower aperture 14B, the handle 1 is extended so as to move on the irregular surface such as downstairs and upstairs 12. When the locking pin 13 is inserted into the upper aperture 14A, the handle 1 is returned to the original position so as to move on the horizontal surface of stairs 12.

Each handle 1 is provided with a skid extension 5 pivotally attached near the lower aperture 14B, by a pivotal connector 8A. The skid extension 5 is provided with a skid 3 with a skid cover 4, pivotally connected to the skid extension 5 by a pivot pin 8B at one end and at the other thereof is pivotally connected to the rear wheel 10B. The handle 1 is extended and the skid 5 is operated to be approximately parallel to the parallel carriage frame 9 so as to slide on the stairs 12 (FIG. 2). At this time, of course, the locking pin 13 is inserted into the upper aperture 14A and the handle 1 is fully extended so that the carriage with a baby or load can be easily pulled and moved down under the theory of leverage motion and sliding mechanism. The skid cover 4 is made of a friction material such as plastic or rubber.

As shown in FIGS. 5 and 6A, the handle receiver 2 is provided with a pair of brake systems attached to the outer end portions thereof, respectively for easily and tightly stopping the 10A and 10B of the carriage on the flat floor of the stairs 12 by operating the brake system.

Each brake system includes a triangular stopper 21 rotatably connected to a triangular stopper connector 21A by a pivotal pin 21F at the second corner of the connector 21A which is pivotally connected to the lower portion of the skid 3 by a pivot pin 21E supported on the outer end of the skid 3 at the first corner of the connector 21A, and a brake on/off lever 15 pivotally supported by a pivot pin 15A on the outer side wall of the skid 3. The on/off lever 15 disposed in a C-shaped channel 16A on a flat support attached to the handle receiver 2 and has a lever end 17 connected to a first spring 18A and a cable 19 wherein the cable 19 is connected to the third corner of the triangular stopper connector 21A through a second spring 18B. The triangular stopper connector 21A is against a stopping pin 21C fixed to the skid 3. The cable 19 slidably moves within a tubular passage 20A supported on a supporter 20 which is fixed to the skid 3. Because of the second spring 18B, the triangular stopper 21 can be smoothly passed over the edges of stairs 12 without release of the on-positioned lever 15.

Accordingly, the triangular stopper 21 is to be intervally rotated by mating, a flat surface of thereof with the flat floor of stairs 12 (FIG. 6A). As also shown in FIG. 6B, the triangular stopper 21 and the triangular stopper connector 21A are rotatably connected to the skid 3 by the pivot pins 21E and 21F with a lock washer 21H, respectively. The triangular stopper 21 has a stopper cover 21G made of a friction material which rests against the floor of stairs 12.

The carriage according to the present invention operates as follows:

As shown in the Figures, when the carriage meets the stairs 12, the pair of handles 1 are pulled by the carrier so as to extend the length of the handles 1, at that time, the pair of skid extensions 5 are pulled by the handles 1. Therefore, the pair of skids 3 and skid extensions 5 form a C-shaped configuration so that the pair of skids 3 are parallel with the pair of parallel frames 9 (FIG. 2). The skids 3 and skid extensions 5 are pivotally connected to each other and the handle receiver 2 and the rear wheels 10B through the pivotal connector 8A and the pivotal connector 8B and the connector 8C.

Accordingly, the skids 3 with the skid cover 4 slide smoothly on edges of the stairs 12 and also, the carrier can pull the carriage with only a little effort when compared with the length of origin handles 1. Since the skids 3 are covered with the skid cover 4 made of an anti-abrasion material such as rubber and plastic, movement of the carrier can be accelerated and the carrier can pull the carriage with little effort.

When the carrier, if necessary, wants to stop on the stairs 12, the brake on/off lever 15 is moved to the on-position from the off-position shown in FIG. 5. Therefore, the cable 9 is pushed in the direction indicated by arrow (D) from arrow (C) shown in FIG. 6A. The cable 19 simultaneously pushes the third corner of the triangular stopper connector 21A about the pivotal pin 21E. That is, the dotted triangular stopper connector 21A moves to the lined triangular stopper connector 21A (FIG. 6A). Accordingly, the triangular stopper 21 rotates in the clockwise direction indicated by arrow (F) from arrow (E) shown in FIG. 6A. At this time, the carriage is effectively stopped on the flat floor of one of the stairs 12. However, when the carriage moves up continuously, without release of the brake on/off lever 15, since there is a biasing force of the second spring 18B, the triangular stopper 21 can be readily rotated in the counter-clockwise direction indicated by arrow (E) from arrow (F) shown in FIG. 6A. At this time, in case the carriage moves down, the triangular stopper 21 can be effectively stopped by rotating in the clockwise direction indicated by arrow (F) from arrow (E) shown in FIG. 6A.

Thereafter, when the brake system releases, for example, when the carriage moves down, the brake on/off lever 15 is returned to the off-position shown in FIG. 5. Therefore, the cable 19 is pulled by the triangular stopper connector 21A and simultaneously the, triangular stopper 21 is removed from the flat floor of one of the stairs 12. Accordingly, the carriage can be effectively pulled along the edges of stairs 12 on the pair of skids 3.

On the contrary, when the carrier wants to go down the stairs 12, the carriage operates in the opposite direction compared with pull of the carriage.

Figure 4:
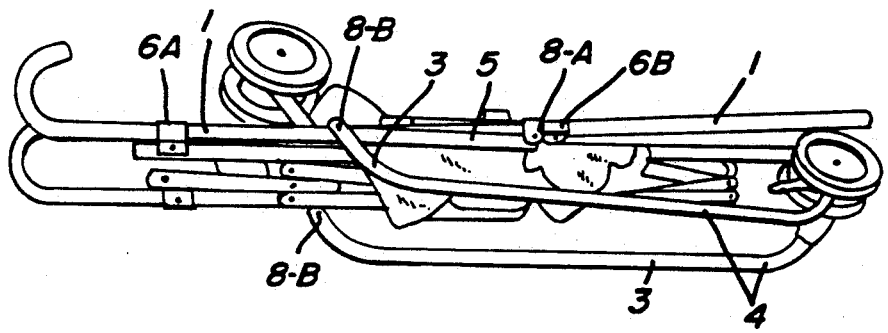
FIG. 4 is a perspective view of the collapsed carriage according to the present invention.

As shown in FIG. 4, when the carriage collapses, first of all, the handles 1 and the skid extensions 5 return to the origin position, and the carriage collapses in the conventional manner.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A carriage for traversing irregular surfaces such as downstairs or upstairs, comprising:
    a carriage frame, a pair of front wheels, and a pair of rear wheels,
    a pair of extendable handles for pushing the carriage, said handles being slidably disposed in a pair of handle receivers which are attached to said carriage frame,
    a pair of skids pivotally connected to a pair of skids and a pair of skid extensions, a lower end of each skid being pivotally connected to a respective rear wheel, an upper end of each skid being pivotally connected to one end of a respective skid extension, and an opposite end of each skid extension being pivotally connected to a lower end of a respective extendable handle for forming a C-shaped configuration when said skids and skid extensions are extended by extending the handles, and
    a brake member attached to said carriage frame for effectively stopping on a flat floor of the irregular surfaces, whereby the carriage can be effectively traversed over the irregular surfaces along the skids and by the extended handles, and, if necessary, the carriage can be effectively stopped on a flat floor of the irregular surfaces by the brake member.

2. The carriage of claim 1, wherein said carriage is a baby stroller, barrel truck, stretcher chair, or lift cart.

3. The carriage of claim 1, wherein said brake member includes a brake on/off lever disposed in a C-shape channel of a flat support of said handle receiver, a triangular stopper connector connected to one end of said brake on/off lever through a second spring at a third corner thereof, a triangular stopper rotatably connected to said triangular stopper connector at a second corner thereof, said triangular stopper connector pivotally connected to said handle receiver at a first corner thereof, whereby upon operation of the brake on/off lever, the triangular stopper can be effectively stopped on the flat floor of the irregular stairs.

4. The carriage of claim 3, wherein said brake on/off lever is connected to a first spring at the other end thereof.

5. The carriage of claim 3, wherein said cable is disposed within a cable cover channel supported on a supporter which is fixed to the handle receiver.

6. The carriage of claim 3, wherein said triangular stopper is provided with a stopping pin for preventing the triangular stopper from moving.

7. The carriage of claim 3, wherein said triangular stopper is covered with an anti-friction material such as plastic or rubber.

8. The carriage of claim 1, wherein said extendable handles are provided with a locking member for locking or releasing the handles to and from the handle receivers.

9. The carriage of claim 8, wherein said locking member has a T-shaped configuration wherein a leg of the T-shaped configured locking member is pivotally supported on the handle receiver, one wing thereof is a button function position, and the other wing thereof has a locking pin for inserting into an aperture of the extendable handles so as to lock the handles to the handle receivers after the handles extend.

10. The carriage of claim 1, wherein said pair of skids are provided with a cover made of anti-abrasion material such as plastic or rubber.

* * * * *